(12) United States Patent
Murata

(10) Patent No.: US 8,770,847 B2
(45) Date of Patent: Jul. 8, 2014

(54) ROLLING BEARING

(71) Applicant: JTEKT Corporation, Osaka (JP)

(72) Inventor: Junji Murata, Kashiba (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/956,651

(22) Filed: Aug. 1, 2013

(65) Prior Publication Data

US 2014/0056547 A1    Feb. 27, 2014

(30) Foreign Application Priority Data

Aug. 21, 2012   (JP) ................... 2012-182079

(51) Int. Cl.
     *F16C 33/66*      (2006.01)
(52) U.S. Cl.
     USPC .......................................................... 384/462
(58) Field of Classification Search
     CPC . F16C 33/583; F16C 33/6614; F16C 33/6651
     USPC ......... 384/462, 475, 513, 516, 606, 615, 622, 384/465, 471, 472
See application file for complete search history.

(56) References Cited

U.S. PATENT DOCUMENTS

| | | | |
|---|---|---|---|
| 999,806 A | | 8/1911 | Latham |
| 3,301,615 A | * | 1/1967 | Brady ........................... 384/472 |
| 4,916,751 A | * | 4/1990 | Sumita et al. ................. 384/516 |
| 5,498,086 A | * | 3/1996 | Ou ................................. 384/491 |
| 6,238,744 B1 | * | 5/2001 | Magoulick et al. ........... 427/369 |
| 2012/0033907 A1 | | 2/2012 | Huhnke et al. |

FOREIGN PATENT DOCUMENTS

| | | | |
|---|---|---|---|
| GB | 1 408 159 | | 10/1975 |
| JP | U-48-33941 | | 4/1973 |
| JP | A-2000-161369 | | 6/2000 |
| JP | 2009002436 A | * | 1/2009 |
| JP | A-2009-108901 | | 5/2009 |
| JP | A-2009-108963 | | 5/2009 |
| JP | A-2012-72851 | | 4/2012 |
| WO | WO 2005/026566 A1 | | 3/2005 |
| WO | WO 2008069133 A1 | * | 6/2008 .............. F16C 33/34 |

OTHER PUBLICATIONS

European Search Report issued in European Application No. 13180876.8 on Jan. 21, 2014.

* cited by examiner

*Primary Examiner* — Phillip A Johnson
(74) *Attorney, Agent, or Firm* — Oliff PLC

(57) ABSTRACT

A rolling bearing includes an inner ring, an outer rind and a plurality of rolling elements. Multiple dynamic pressure generating grooves are formed in at least one of an inner ring raceway surface and an outer ring raceway surface so as to be arranged at equal intervals in the circumferential direction. The number of the dynamic pressure generating grooves and the number of the rolling elements are set so as to establish a relationship expressed by $A=[\{n+(n+1)\}/2] \cdot Z$, where A is the number of the dynamic pressure generating grooves, Z is the number of the rolling elements, and n is a natural number (1, 2, 3 . . . ).

2 Claims, 3 Drawing Sheets

ROLLING BEARING

INCORPORATION BY REFERENCE

The disclosure of Japanese Patent Application No. 2012-182079 filed on Aug. 21, 2012 including the specification, drawings and abstract is incorporated herein by reference in its entirety.

BACKGROUND OF THE INVENTION

1. Field of the Invention

The invention relates to a rolling bearing.

2. Description of Related Art

In a rolling bearing including an inner ring, an outer ring and a plurality of rolling elements rollably arranged between an inner ring raceway surface of the inner ring and an outer ring raceway surface of the outer ring, a plurality of dynamic pressure generating grooves may be formed in the raceway surface in order to reduce torque of the rolling bearing. Further, as described in Japanese Patent Application Publication No. 2009-108963 (JA 2009-108963 A), there is a rolling bearing in which multiple grooves having a finite length that corresponds to a width of each of the rolling elements in a direction orthogonal to a rolling direction of the rolling elements, are formed in a contact region of the raceway surface, at which the rolling elements contact the raceway surface. With this configuration, lubrication oil is retained in the grooves and therefore hardly flows out, so that dynamic pressure is generated.

The inner ring and the outer ring of the rolling bearing are subjected to precision machining in order to form their raceway surfaces into substantially true circles. However, the raceway surfaces have slight waviness, which cause vibrations during rotation of the bearing. The (amplitude of) vibration of the rolling bearing becomes larger when the number of the waves is equal to or nearly equal to an integer multiple of the number of the rolling elements. That is, the (amplitude of) vibration of the rolling bearing becomes larger when a relationship expressed by $X=nZ$ or $X=nZ\pm 1$ is established, where X is the number of waves, Z is the number of rolling elements, and n is a natural number $(1, 2, 3 \ldots)$.

When multiple dynamic pressure generating grooves are formed in the raceway surface so as to be arranged at equal intervals in the circumferential direction, the dynamic pressure generating grooves cause the action similar to that of the waviness. Thus, when a relationship expressed by $A=nZ$ or $A=nZ\pm 1$ is established, where A is the number of waves, Z is the number of rolling elements, and n is a natural number $(1, 2, 3 \ldots)$, the (amplitude of) vibration of the rolling bearing becomes larger, which may exert negative influence on reduction of torque of the rolling bearing and the durability of the rolling bearing.

SUMMARY OF THE INVENTION

An object of the invention is to provide a rolling bearing configured such that the (amplitude of) vibration of the rolling bearing is suppressed to a low level, the vibration being caused due to a plurality of dynamic pressure generating grooves formed in a raceway surface so as to be arranged at equal intervals in the circumferential direction.

An aspect of the invention relates to a rolling bearing including an inner ring, an outer ring arranged radially outward of the inner ring via an annular space so as to be concentric with the inner ring, and a plurality of rolling elements rollably arranged between an inner ring raceway surface formed in an outer peripheral face of the inner ring and an outer ring raceway surface formed in an inner peripheral face of the outer ring. Multiple dynamic pressure generating grooves are formed in at least one of the inner ring raceway surface and the outer ring raceway surface so as to be arranged at equal intervals in a circumferential direction. The number of the dynamic pressure generating grooves and the number of the rolling elements are set so as to establish a relationship expressed by $A=[\{n+(n+1)\}/2]\cdot Z$, where A is the number of the dynamic pressure generating grooves, Z is the number of the rolling elements, and n is a natural number $(1, 2, 3 \ldots)$. Note that the number A of the dynamic pressure generating grooves is set to a positive integer number (natural number) obtained by rounding off (or rounding up) the obtained number to the closest whole number. In this case, "multiple" signifies the number equal to or larger than three.

BRIEF DESCRIPTION OF THE DRAWINGS

The foregoing features and advantages of the invention will become apparent from the following description of example embodiments with reference to the accompanying drawings, wherein like numerals used to represent like elements, and wherein.

DETAILED DESCRIPTION OF EMBODIMENTS

Hereinafter, an embodiment of the invention will be described with reference to the accompanying drawings.

Figure 1:
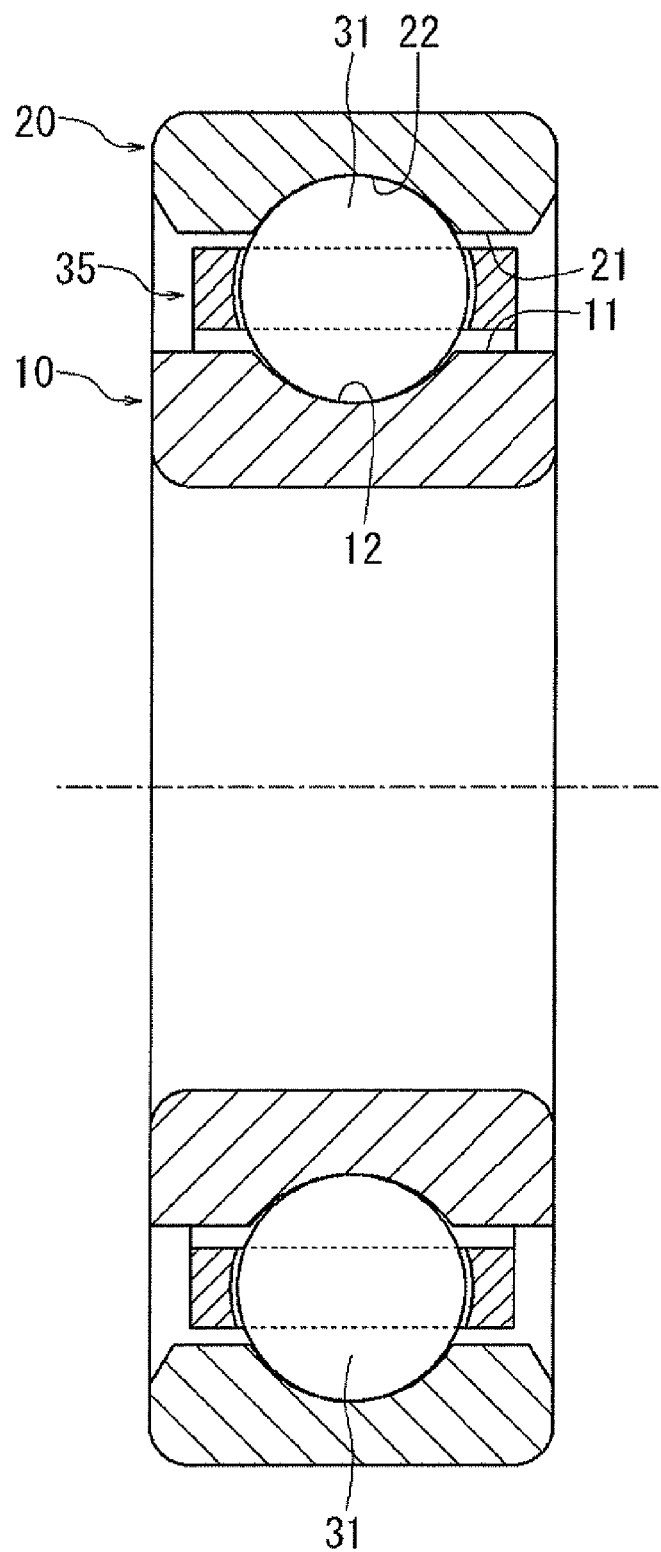
FIG. 1 is a sectional view illustrating a rolling bearing according to an embodiment of the invention, taken along the axial direction of the rolling bearing.

In the present embodiment, a case where a deep groove ball bearing is used as a rolling bearing will be described. As shown in FIG. 1, the deep groove ball bearing used as the rolling bearing includes an inner ring 10, an outer ring 20, multiple (three or more) balls 31 used as rolling elements, and a cage 35. The inner ring 10 is formed in a cylindrical shape, and has an inner ring raceway surface 12 that is formed in an axially center portion of an outer peripheral face 11 and that defines an arc-shaped annular groove.

As shown in FIG. 1, the outer ring 20 is formed in a cylindrical shape and has an inner diameter that is larger than an outer diameter of the inner ring 10, and is arranged radially outward of the inner ring 10 via an annular space so as to be concentric with the inner ring 10. The outer ring 20 has an outer ring raceway surface 22 that is formed in an axially center portion of an inner peripheral face and that defines an arc-shaped annular groove. The balls 31 are rollably arranged between the inner ring raceway surface 12 and the outer ring raceway surface 22 while being held by the cage 35.

Figure 2:
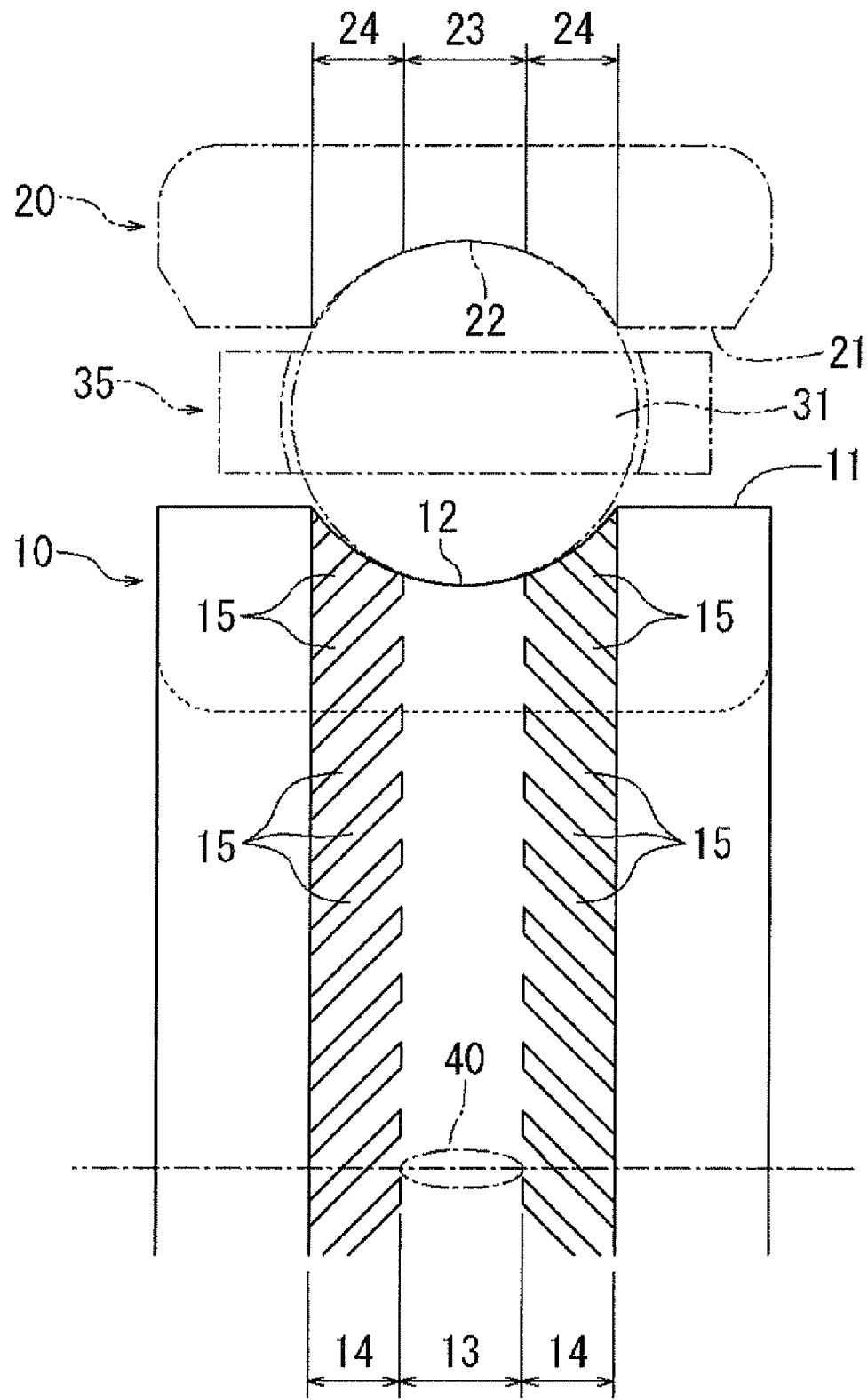
FIG. 2 is a side view of an inner ring of the rolling bearing according to the embodiment of the invention, illustrating an inner ring raceway surface of the inner ring.
Figure 3:
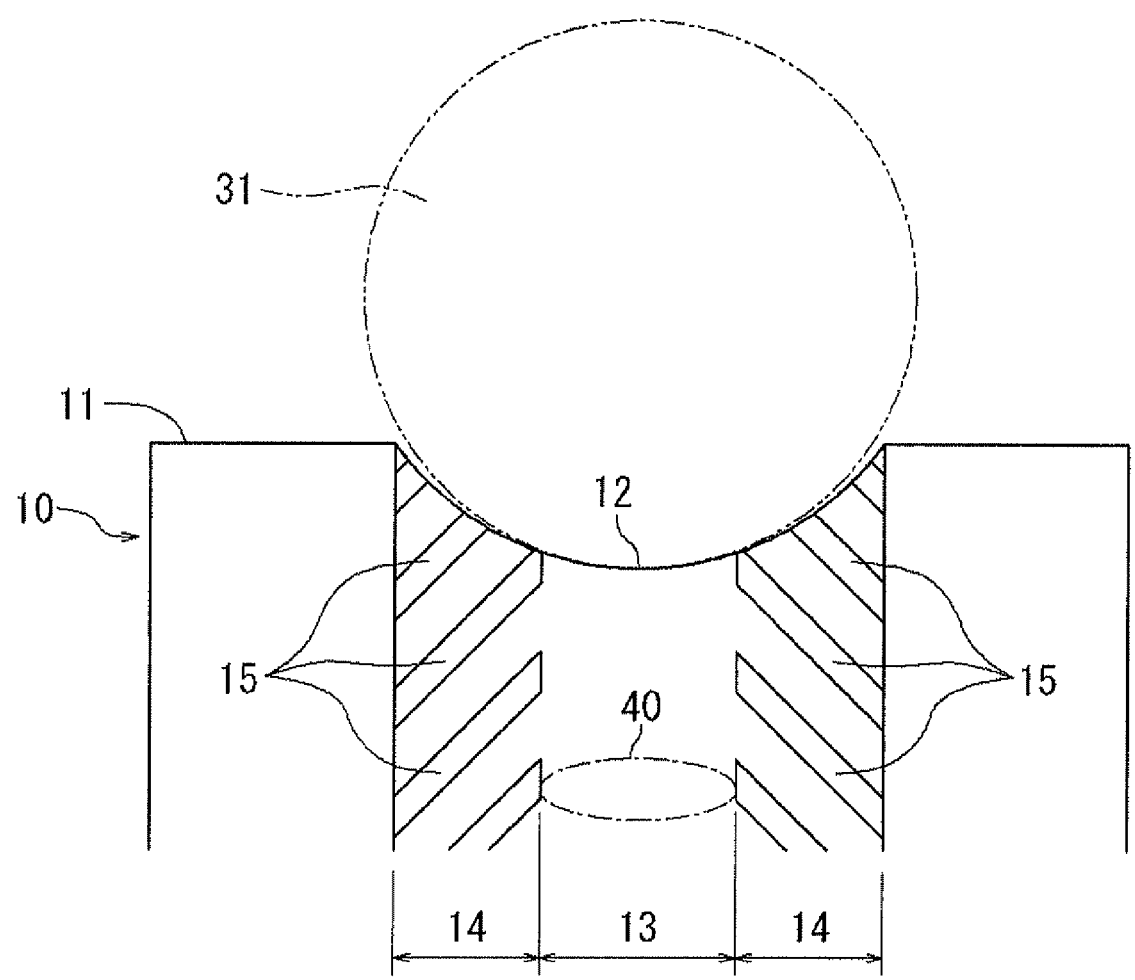
FIG. 3 is an enlarged side view illustrating a plurality of dynamic pressure generating grooves formed in the inner ring raceway surface of the rolling bearing according to the embodiment of the invention.

As shown in FIG. 2 and FIG. 3, the inner ring raceway surface 12 and the outer ring raceway surface 22 respectively have contact regions 13, 23 that are brought into contact with the balls 31, and non-contact regions 14, 24 that are formed outsides respective end portions of the contact regions 13, 23 so as to be adjacent to the respective end portions of the contact regions 13, 23, and that are not brought into contact with the balls 31. Note that an ellipse indicated by a long dashed double-short dashed line in FIG. 2 and FIG. 3 is a contact ellipse 40 at which the inner ring 10 contacts the ball 31, and each of the contact regions 13, 23 has an axial width that corresponds to a major axis of the contact ellipse 40.

Multiple (three or more) dynamic pressure generating grooves 15 are formed in at least one of the inner ring raceway surface 12 and the outer ring raceway surface 22 so as to be arranged at equal intervals in the circumferential direction. Further, in the present embodiment, the multiple dynamic pressure generating grooves 15 are arranged in the two non-contact regions 14 of the inner ring raceway surface 12 in a herringbone pattern. That is, the multiple dynamic pressure generating grooves 15 are formed so as to be opened at their outer ends toward the outsides of the non-contact regions 14, and so as to be in contact at their inner ends with the boundary between the non-contact regions 14 and the contact region 13. Further, the multiple dynamic pressure generating grooves 15 are formed as inclined grooves such that the inner ends of the multiple dynamic pressure generating grooves 15 are positioned forward of the outer ends of the multiple dynamic pressure generating grooves 15 in the rotation direction of the inner ring 10. With this configuration, when the inner ring 10 is rotated, dynamic pressure is generated in the lubrication oil at the inner ends of the multiple dynamic pressure generating grooves 15.

Further, the number of the multiple dynamic pressure generating grooves 15 (in the circumferential direction) and the number of the multiple balls 31 are set so as to establish a relationship expressed by $A=[\{n+(n+1)\}/2] \cdot Z$, where A is the number of the dynamic pressure generating grooves 15 in the circumferential direction, Z is the number of the balls 31 and n is a natural number (1, 2, 3 . . . ). Note that the number A of the dynamic pressure generating grooves 15 is set to a positive integer number (natural number) obtained by rounding off (or rounding up) the obtained number to the closest whole number.

The deep groove ball bearing as the rolling bearing according to the embodiment is configured as described above. Therefore, because the multiple dynamic pressure generating grooves 15 are formed in the inner ring raceway surface 12 so as to be arranged at equal intervals in the circumferential direction, dynamic pressure is generated in the lubrication oil at the inner ends of the multiple dynamic pressure generating grooves 15 when the inner ring 10 is rotated during rotation of the bearing. Thus, it is possible to appropriately reduce the torque of the deep groove ball bearing.

Further, it is assumed that the multiple dynamic pressure generating grooves 15 formed in the inner ring raceway surface 12 so as to be arranged at equal intervals in the circumferential direction cause the action similar to that of waviness. Thus, the number of dynamic pressure generating grooves 15 and the number of balls 31 are set so as to establish a relationship expressed by $A=[\{n+(n+1)\}/2] \cdot Z$, where A is the number of the dynamic pressure generating grooves 15 (in the circumferential direction), Z is the number of the balls 31, and n is a natural number (1, 2, 3 . . . ). Thus, when one of the multiple balls 31 is located at a position corresponding to the inner end of one of the multiple dynamic pressure generating grooves 15, the other balls 31 are located at positions offset from the inner ends of the remaining dynamic pressure generating grooves 15. That is, the situation where all the balls 31 are located at positions corresponding to the inner ends of all the dynamic pressure generating grooves 15 does not take place. In addition, the situation where all the balls 31 are located at positions offset from the inner ends of all the dynamic pressure generating grooves 15 after being located at the positions corresponding to the inner ends of all the dynamic pressure generating grooves 15 does not take place. Thus, the (amplitude of) vibration of the deep groove ball bearing is suppressed to a level lower than that in the a where all the balls 31 are located at positions corresponding to the inner ends of all the dynamic pressure generating grooves 15 and then all the balls 31 are located at positions offset from the inner ends of all the dynamic pressure generating grooves 15.

Further, in the present embodiment, the multiple dynamic pressure generating grooves 15 are formed in the non-contact regions 14 of the inner ring raceway surface 12. Thus, the original function of the multiple dynamic pressure generating grooves 15 is fulfilled while generation of vibration caused by the multiple dynamic pressure generating grooves 15 is suppressed, in comparison with the case where the multiple dynamic pressure generating grooves 15 are formed in the contact region 13. In this way, it is possible efficiently reduce the torque of the deep groove ball bearing and improve the durability of the deep groove ball bearing.

Note that the invention is not limited to the above-described embodiment, and may be implemented in various other embodiments within the scope of the invention. For example, in the above-described embodiment, the multiple dynamic pressure generating grooves 15 are formed in the inner ring raceway surface 12. However, the invention may be implemented also in the case where multiple dynamic pressure generating grooves are formed in at least one of the inner ring raceway surface 12 and the outer ring raceway surface 22. Further, the invention may be implemented also in the case where the multiple dynamic pressure generating grooves are extended into at least one of the contact regions 13, 23 of the inner ring raceway surface 12 and the outer ring raceway surface 22, which are brought into contact with the multiple balls 31. Moreover, in the above-described embodiment, the rolling bearing is a deep groove ball bearing. However, the rolling bearing may be an angular contact ball bearing or a roller bearing. Note that rollers are formed into a crowning shape in the case where the rolling bearing is a roller bearing.

According to the invention, because the multiple dynamic pressure generating grooves are formed in the non-contact regions of the raceway surface, the original function of the dynamic pressure generating grooves is fulfilled while generation of vibration caused by the dynamic pressure generating grooves is suppressed. Therefore, it is possible to efficiently reduce the torque of the rolling bearing and improve the durability of the rolling bearing.

What is claimed is:

1. A rolling bearing, comprising:
   an inner ring;
   an outer ring arranged radially outward of the inner ring via an annular space so as to be concentric with the inner ring; and
   a plurality of rolling elements rollably arranged between an inner ring raceway surface formed in an outer peripheral face of the inner ring and an outer ring raceway surface formed in an inner peripheral face of the outer ring, wherein
   multiple dynamic pressure generating grooves are formed in at least one of the inner ring raceway surface and the outer ring raceway surface so as to be arranged at equal intervals in a circumferential direction, and
   the number of the dynamic pressure generating grooves and the number of the rolling elements are set so as to establish a relationship expressed by $A=[\{n+(n+1)\}/2] \cdot Z$, where A is the number of the dynamic pressure generating grooves, Z is the number of the rolling elements, and n is a natural number (1, 2, 3 . . . ).

2. The rolling bearing according to claim 1, wherein the multiple dynamic pressure generating grooves are formed in non-contact regions of the raceway surface, the non-contact regions being located outside and adjacent to a contact region that contacts the multiple rolling elements.

* * * * *